US011679557B2

(12) United States Patent
Pieger et al.

(10) Patent No.: US 11,679,557 B2
(45) Date of Patent: Jun. 20, 2023

(54) PROCESSING MACHINES AND METHODS FOR HEATING A POWDER TO PRODUCE THREE-DIMENSIONAL COMPONENTS

(71) Applicant: TRUMPF Laser- und Systemtechnik GmbH, Ditzingen (DE)

(72) Inventors: Markus Pieger, Wendlingen am Neckar (DE); Matthias Allenberg-Rabe, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 5 days.

(21) Appl. No.: 16/870,326

(22) Filed: May 8, 2020

(65) Prior Publication Data
US 2020/0269500 A1 Aug. 27, 2020

Related U.S. Application Data

(63) Continuation of application No. PCT/EP2018/079389, filed on Oct. 26, 2018.

(30) Foreign Application Priority Data

Nov. 9, 2017 (DE) .......................... 102017219982.2

(51) Int. Cl.
*B29C 64/277* (2017.01)
*B33Y 10/00* (2015.01)
(Continued)

(52) U.S. Cl.
CPC ............ *B29C 64/277* (2017.08); *B22F 10/36* (2021.01); *B22F 10/47* (2021.01); *B22F 12/42* (2021.01);
(Continued)

(58) Field of Classification Search
CPC ... B29C 64/153; B29C 64/255; B29C 64/295; B29C 64/277; B29C 64/268; B29C 64/393; B33Y 10/00; B33Y 30/00; B33Y 50/02
See application file for complete search history.

(56) References Cited

U.S. PATENT DOCUMENTS 5,393,482 A * 2/1995 Benda .................... B33Y 40/00
419/61
10,245,681 B2 4/2019 Koerber
(Continued)

FOREIGN PATENT DOCUMENTS

DE 69411280 T2 11/1998
DE 19619339 B4 2/2005
(Continued)

OTHER PUBLICATIONS

DE Search Report in German Appln. No. 10 2017 219 982.2, dated Nov. 9, 2017, 18 pages (with English translation).
(Continued)

*Primary Examiner* — Joseph S Del Sole
*Assistant Examiner* — Jamel M Nelson
(74) *Attorney, Agent, or Firm* — Fish & Richardson P.C.

(57) ABSTRACT

The disclosure relates to processing machines and methods for producing three-dimensional components by irradiating powder with a processing beam, the machines including a container with a moveable support for the powder, as well as an irradiating device with a scanner device for aligning the processing beam on a processing field at an opening of the container. The irradiating device includes a heating device that includes a heating radiation source for generating a heating beam for heating the powder from above and including a beam shaping optical unit configured to convert
(Continued)

a first beam profile of the heating beam into a second beam profile, e.g., a ring-shaped beam profile, of the heating beam.

17 Claims, 1 Drawing Sheet

(51) Int. Cl.

| | |
|---|---|
| *B29C 64/153* | (2017.01) |
| *B29C 64/255* | (2017.01) |
| *B29C 64/295* | (2017.01) |
| *B29C 64/393* | (2017.01) |
| *B29C 64/268* | (2017.01) |
| *B22F 12/42* | (2021.01) |
| *B22F 12/44* | (2021.01) |
| *B22F 12/45* | (2021.01) |
| *B22F 12/49* | (2021.01) |
| *B22F 12/90* | (2021.01) |
| *B22F 10/47* | (2021.01) |
| *B22F 10/36* | (2021.01) |
| *B33Y 30/00* | (2015.01) |
| *B33Y 50/02* | (2015.01) |
| *B22F 10/28* | (2021.01) |

(52) U.S. Cl.
CPC .............. *B22F 12/44* (2021.01); *B22F 12/45* (2021.01); *B22F 12/49* (2021.01); *B22F 12/90* (2021.01); *B29C 64/153* (2017.08); *B29C 64/255* (2017.08); *B29C 64/268* (2017.08); *B29C 64/295* (2017.08); *B29C 64/393* (2017.08); *B33Y 10/00* (2014.12); *B22F 10/28* (2021.01); *B33Y 30/00* (2014.12); *B33Y 50/02* (2014.12)

(56) References Cited

U.S. PATENT DOCUMENTS

| | | | |
|---|---|---|---|
| 2003/0052105 A1* | 3/2003 | Nagano | B29C 64/277 |
| | | | 219/121.83 |
| 2011/0237731 A1* | 9/2011 | Paternoster | C08L 77/06 |
| | | | 524/441 |
| 2015/0050463 A1 | 2/2015 | Nakano et al. | |
| 2015/0246481 A1* | 9/2015 | Schlick | B22F 10/38 |
| | | | 264/461 |
| 2017/0151630 A1* | 6/2017 | Huang | B23K 26/0648 |
| 2018/0370127 A1 | 12/2018 | Paternoster et al. | |
| 2019/0270246 A1* | 9/2019 | Fujishima | B23K 26/073 |

FOREIGN PATENT DOCUMENTS

| | | | | |
|---|---|---|---|---|
| DE | 102006053121 B3 * | 12/2007 | | B22F 10/20 |
| DE | 102014208565 A1 | 2/2015 | | |
| DE | 102015213103 A1 | 1/2017 | | |
| DE | 102015215645 A1 | 2/2017 | | |
| EP | 1296788 B1 * | 1/2005 | | B33Y 30/00 |
| EP | 2335848 A1 | 6/2011 | | |
| EP | 2913124 A2 | 9/2015 | | |
| JP | 2002069507 A | 3/2002 | | |
| WO | WO 1992/08566 A1 | 5/1992 | | |
| WO | WO 2014/206573 A2 | 12/2014 | | |
| WO | WO 2016/049621 A | 3/2016 | | |

OTHER PUBLICATIONS

PCT International Preliminary Report on Patentability in International Appln. No. PCT/EP2018/079389, dated May 12, 2020, 15 pages (with English translation).
PCT International Search Report and Written Opinion in Appln. No. PCT/EP2018/079389, dated Jan. 28, 2019, 18 pages (with English translation).
EP Office Action in European Appln. No. 18793651.3, dated Dec. 19, 2022, 11 pages (with English translation).

* cited by examiner

PROCESSING MACHINES AND METHODS FOR HEATING A POWDER TO PRODUCE THREE-DIMENSIONAL COMPONENTS

CROSS REFERENCE TO RELATED APPLICATIONS

This application is a continuation of and claims priority under 35 U.S.C. § 120 from PCT Application No. PCT/EP2018/079389, filed on Oct. 26, 2018, which claims priority from German Application No. 10 2017 219 982.2, filed on Nov. 9, 2017. The entire contents of each of these priority applications are incorporated herein by reference.

TECHNICAL FIELD

The present disclosure relates to processing machines and methods for producing three-dimensional components layer by layer by irradiating a powder by a processing beam, in particular by a laser beam, including a container with a moveable, e.g., lowerable, support, typically a substantially plate-shaped support, for the powder, and an irradiating device with a scanner device for aligning the processing beam on a processing field at an opening of the container for producing the three-dimensional component layer by layer by irradiating the powder.

BACKGROUND

WO 2016/049621 A1 describes a system for preheating building material using a laser scanner in an additive manufacturing environment. The system has a laser scanner for directing a laser beam onto a surface of the building material in a targeted manner. A computer control system is embodied to determine one or more portions of the surface of the building material for preheating on the basis of a target temperature distribution and an actual temperature distribution of the building material and to drive the laser scanner to align the laser beam on the one or more portions. The system can include a heat sensor, for example an infrared camera, for determining the temperature distribution in the building material. An infrared lamp can be provided to preheat the building material to a temperature that is lower than the target temperature distribution. The actual temperature distribution can be determined from the heat distribution of an object that is intended to be produced from the building material.

EP 2 335 848 A1 describes an optical irradiation unit including optical components for guiding and focusing a beam path of a first laser beam, and an optical splitting or coupling unit for splitting the first laser beam into at least two partial beams and/or for coupling a second laser beam with a wavelength that differs from the wavelength of the first laser beam into the beam path of the first laser beam. The second laser beam can be a diode laser beam which is coupled into the first laser beam in such a way that it strikes the same point on the powder layer in order to preheat this point on the powder layer in a location-selective manner. An apparatus for producing workpieces by irradiating powder layers of a raw material powder can include such an irradiation unit and a multiplicity of diode lasers which are disposed over the powder layer and embodied to preheat the powder layer homogeneously.

DE 10 2015 215 645 A1 describes an apparatus and a method for heating an object by irradiating it using an irradiation source. The apparatus includes a beam source for generating a beam with a first beam profile, a beam guiding device with a beam guiding optical unit for transforming the first beam profile into a second, adjustable beam profile that is fed to the irradiated region of the object, and a control device for driving the beam shaping optical unit and/or the beam source for generating a target temperature distribution in the irradiated region of the object. The object can be arranged in a process chamber in an apparatus for treating a surface of the object. The irradiated region can be formed on a side of the object facing away from the surface to be treated.

DE 10 2015 213 103 A1 discloses a method and an apparatus for producing a three-dimensional object, in which a powder layer applied to a support is preheated by a radiant heater. The radiant heater is designed to preheat the entire construction field and, where necessary, part of a worktop lying in a working plane.

A processing machine for generating a three-dimensional component by selective laser melting is disclosed in WO 2014/206573 A2, which processing machine includes a process chamber and at least one functional interface that extends into the process chamber and is connectable to a process influencing device for acting on an already completed region of the component during selective laser melting. The heat balance of the arising component can be influenced indirectly during selective laser melting by virtue of heating a base plate that is used to generate the three-dimensional component layer by layer.

SUMMARY

The present disclosure provides processing machines and methods for heating a powder that facilitate the generation of a temperature distribution of the powder that is as homogeneous as possible in the region of the processing field. These machines include an irradiating device that includes a heating device including a heating radiation source for generating a heating beam for heating the powder from above by aligning the heating beam on the processing field and further including a beam shaping optical unit configured to convert a first beam profile of the heating beam into a second beam profile, e.g., a ring-shaped beam profile, of the heating beam.

The heating beam is typically not deflected in the scanner device; i.e., the heating beam does not strike a scanning mirror or mirrors of a scanner device. Rather, the heating radiation source is generally embodied to align the beam axis of the heating beam in stationary fashion on the same point of the processing field. The alignment (and the angle) of the beam axis of the heating beam relative to the processing field is also typically constant.

Even with a homogeneous supply of heat provided to the powder, a strong temperature gradient may arise within the powder on account of geometric conditions. This also applies in the event that a further heating device (as described below) is provided for typically homogeneously heating the powder from below, for example, by heating the generally approximately plate-shaped support. In this case, too, there is a strong temperature gradient within the powder on account of the large radiating surface (lateral surface and top surface or top of the plate-shaped support) with, at the same time, restricted options for supplying heat. This applies in particular to the case where the further heating device is embodied to supply the heating power only via the underside of the support to a substrate or base plate of the support, for example, because the underside, depending on the material strength of the plate-shaped support, corresponds only to about a third of the total surface of the support. The occurrence of a temperature gradient in the powder is problematic, in particular, on the top of the powder or the powder bed, on which the powder is irradiated by the processing beam.

Heat losses from the heating power introduced into the powder arise from convection, e.g., from heat being given off to the moving, surrounding gas, from heat conduction via the usually metallic powder directly to the generally cooled wall of the container, and from radiation losses to all adjacent surfaces. If the support is lowered into the container in the course of the layer-by-layer construction process of the three-dimensional component, these heat losses lead to an inhomogeneous heat balance or to an inhomogeneous temperature distribution in the container, e.g., on the upper side of the powder or the powder bed. Particularly where the container has a substantially cylindrical (e.g., circular) geometry, the temperature distribution in the processing field, i.e., on the top of the powder, can be a Gaussian distribution that is substantially symmetric with respect to the vertical center axis of the container.

The disclosure proposes the inhomogeneous temperature distribution of the powder in the processing field to be at least partly homogenized by virtue of the heating device supplying heat to the cooler partial regions of the powder in a targeted fashion to homogenize the temperature distribution of the processing field, which is generally circular. Particularly where the processing field has a circular geometry, the use of a (circular) ring-shaped beam profile of the heating beam has been found to be particularly suitable for this purpose.

Within the meaning of this application, a ring-shaped beam profile is understood to mean a beam profile in which the maximum of the intensity distribution is not assumed to be in the center of the beam profile, but rather along a typically ring-shaped region, which is spaced from the center of the beam profile. The ring-shaped beam profile or the intensity distribution thereof is typically rotationally symmetric with respect to the center of the beam profile. Where necessary, the intensity distribution of the ring-shaped beam profile can additionally vary in the circumferential direction, i.e., there are angular ranges of the ring-shaped beam profile with higher and with lower intensity.

For the heating of the outer portions in relation to the center axis of the container or of the construction cylinder, it is advantageous to generate a ring-shaped intensity distribution of the heating beam, the diameter or size of which approximately corresponds to the diameter or the size of the processing field. Such a ring-shaped beam profile can be generated from a heating beam with, e.g., a substantially Gaussian beam profile using a beam shaping optical unit. By heating the powder from above with a heating beam with a ring-shaped beam profile, e.g., in combination with additional heating of the powder from below, an approximately homogeneous temperature distribution can already be generated in the powder bed or in the powder arranged level with the processing plane, without this needing complex closed-loop control.

Here, it was found to be advantageous to generate the heating beam in the irradiating device and couple the beam into a process chamber, in which the powder is disposed, through a window. The heating beam can, for example, be coupled into the process chamber through a common window with the processing beam, which is used to irradiate the powder for producing the three-dimensional component layer by layer. In contrast to the processing beam, which is aligned on different points of the processing field with the aid of the scanner device, the beam axis of the heating beam typically or always strikes the center of the processing field or the beam axis of the heating beam is typically or always aligned perpendicular to the processing plane. As described herein, the external diameter of the beam profile of the heating beam in the processing plane typically corresponds to the size of the processing field, i.e., the size or the diameter of the opening in the container.

In another aspect, the processing machine includes a further heating device for heating the powder from below by heating the support. The heating time can be shortened by additionally heating the powder from below. With the aid of the heating beam, the powder can be additionally heated, particularly in the portions of the processing field in which the powder during heating from below cools down too much, and so, overall, a temperature distribution that is as homogeneous as possible sets in the powder. The temperature distribution generated when heating the powder from below can be, e.g., a temperature distribution that is substantially Gaussian in the radial direction.

In one embodiment, the further heating device includes at least one infrared radiation source and/or at least one heating element embedded in the support for heating the support. The further heating device for heating the powder from below can be an (infrared) radiant heater which is spaced apart from the support and which is typically disposed under the support. As an alternative or in addition thereto, the further heating device can have a heat conduction heater, i.e., one or more heating elements or radiators, which are usually disposed on the underside of the support and pressed into the support. In both cases, the heating power is supplied to the support only from its underside by the further heating device.

In one embodiment, the beam shaping optical unit is embodied to set or alter an intensity distribution of the second beam profile of the heating beam. As described above, when the three-dimensional component is produced layer by layer, the support is incrementally lowered such that a powder bed that increases in height with increasing process duration is formed above the support. Since the powder bed conducts the heat poorly, but the portions of the powder bed melted during the production of the three-dimensional component conduct the heat well, there may be a time-dependent distortion during the production process of the temperature distribution that is Gaussian in the radial direction, generated on account of the heating of the powder from below. In simple terms, such a distortion leads to the Gaussian distribution becoming flatter or steeper. For homogenization, it is advantageous if the spatial distribution of the intensity of the radiation within the beam profile is adjusted, e.g., in the radial direction, i.e., in relation to the beam axis of the heating beam, to allow the flatter or steeper Gaussian distribution, which is generated by the further heating device, to be taken into account and in this way overall to obtain a temperature distribution in the powder that is as homogeneous as possible. Setting the intensity distribution of the second beam profile is also useful to adapt the second beam profile to different powder materials should these have different thermal conductivities.

When setting the intensity distribution of a second, ring-shaped beam profile of the heating beam, it is possible, for example, to set the size or the diameter of a beam profile region around the beam axis or around the center of the beam profile, in which the intensity of the heating beam lies below an intensity threshold value which can be, for example, approximately 90% of the maximum intensity of the heating radiation in the beam profile. As an alternative or in addition thereto, a distance between the beam axis of the heating beam and a ring-shaped beam profile region, at which the beam profile has its maximum intensity, can be set when setting the intensity distribution of the beam profile.

In a further embodiment, the beam shaping optical unit is embodied to set an intensity difference between a minimum intensity and a maximum intensity of the second beam profile of the heating beam. The second beam profile typically adopts the minimum intensity or a (local) intensity minimum on the beam axis of the heating beam, i.e., in the center of the beam profile. Depending on the type of employed powder material, in particular on the thermal conductivity thereof, it can be advantageous to generate a heating beam in which the intensity difference can be varied in such a way that the latter generates a temperature difference between the center and the radial edge region of the powder in the processing field, which temperature difference varies between small temperature differences of, e.g., a few Kelvin and large temperature differences of, e.g., approximately 50 K to 100 K.

For example, the intensity difference can also be set depending on the construction progress when producing the three-dimensional component, e.g., depending on the (cross-sectional) geometry of the component to be produced, since the thermal conductivity of the powder material differs from the thermal conductivity of the already produced layers of the three-dimensional component. In the case where layers with a relatively large cross-section, possibly distributed over the entire processing field, are initially produced when producing the component or a plurality of components, the heat in the processing field has a substantially homogeneous distribution on account of the good thermal conductivity of the molten powder layers, but drops more strongly in the edge regions of the processing field. It may be advantageous in this case to generate a comparatively large intensity difference. Should the produced component or components become more delicate towards the top, a temperature distribution may drop more strongly in continuous fashion in the direction of the edge of the processing field. In this case, it is advantageous if the intensity difference of the second beam profile is not too great. Adjusting the intensity distribution of the beam profile of the heating beam can be achieved, for example, by using axicons provided in the beam shaping optical unit, as described in more detail below.

In a further embodiment, the beam shaping optical unit is embodied to generate a second beam profile of the heating beam, in which a minimum intensity of the heating beam along the beam axis of the heating beam is at least 60% of a maximum intensity of the heating beam. It can be advantageous for the second beam profile to have an intensity distribution that is not too strongly inhomogeneous and that increases in the radial direction to the outer edge of the beam profile; i.e., the intensity of the heating beam should not decrease too strongly in the center of the intensity distribution. An intensity distribution with such a beam profile can be generated, for example, by choosing a suitable apex angle of an axicon provided in the beam shaping optical unit.

In another embodiment, the beam shaping optical unit includes at least one axicon for generating the second, ring-shaped beam profile. The axicon, which can be formed from fused silica, for example, converts the collimated heating beam with, e.g., a Gaussian beam profile, into a ring-shaped beam profile with a divergence specified by the apex angle of the axicon. The divergent heating beam with the ring-shaped beam profile can subsequently be collimated at a further optical element of the beam shaping optical unit, for example, at a lens.

In one embodiment, the beam shaping optical unit includes two axicons, the spacing of which is adjustable for altering the intensity distribution of the second beam profile of the heating beam. The first axicon can be a plano-convex axicon that generates the ring-shaped beam profile, as described herein. The second axicon can be a plano-concave axicon, which, for example, can have the same apex angle as the first axicon. A heating beam striking the first axicon in collimated fashion propagates in collimated fashion again downstream of the second axicon, but it has virtually no intensity in the center of the beam profile or in the region of the beam axis of the heating beam. By changing the distance between the two axicons, the size or the diameter of the profile region in which the heating beam has virtually no intensity anymore can be set. At the same time, the distance between the beam axis of the heating beam and a ring-shaped beam profile region, at which the beam profile has its maximum intensity, and the intensity difference between a minimum intensity and a maximum intensity of the beam profile, can also be set in this way.

It is understood that the beam shaping optical unit could include other optical elements, for example, in the form of diffractive optical elements, instead of axicons, for converting the first beam profile, e.g., a Gaussian beam profile, into a second, e.g., ring-shaped beam profile. It is also possible to realize the change in the intensity distribution of the beam profile in relation to the beam axis of the heating beam in a different way, for example, by introducing different diffractive optical elements into the beam path of the heating beam.

In a further embodiment, the heating radiation source is embodied to generate the heating beam with an adjustable power. By way of example, the power can be set, by setting the current fed to the heating radiation source for generating the heating beam. By adjusting the power of the heating radiation source, there can likewise be an adaptation to a flatter or steeper Gaussian temperature distribution in the powder as an alternative or in addition to the change in the intensity distribution of the beam profile, the Gaussian temperature distribution being generated by heating the powder from below by means of the further heating device, overall, to generate a temperature distribution that is as homogeneous as possible in the powder in the processing field.

In another embodiment, the heating radiation source includes a plurality of laser diodes for generating the heating radiation. The power of laser diodes can be set or controlled in a particularly simple manner. For example, the laser diodes can be pump diodes which are used for pumping solid-state lasers, for example, and which are available in large numbers and thus at low cost. Laser diodes also have a directional emission characteristic, and so laser radiation generated by laser diodes can be focused in a simple manner. Optionally, infrared emitters, in particular quartz emitters, can also be used in the heating radiation source instead of laser diodes. However, the emission characteristic of quartz emitters is difficult to control, quite in contrast to laser radiation, which can be ideally shaped and steered in controlled fashion to where it is needed.

In some embodiments, the heating radiation source includes a plurality of optical fibers, wherein a respective input-side fiber end of an optical fiber is coupled to a respective laser diode and wherein output-side fiber ends of the optical fibers form a fiber bundle for the emergence of the heating beam. In this case, use is preferably made of laser diodes, which already have a coupling into a respective pump or optical fiber in any case. By way of example, the number of laser diodes can be chosen such that a total output of the heating radiation source of between approximately 100 W and approximately 3000 W is generated. The laser diodes or the optical fibers are disposed in such a way in this case that the optical fibers converge in a fiber bundle so that the bundle of the output-side ends of the optical fibers serve as an image point or image spot for the further beam guidance of the heating beam. This simplifies the supply of the laser power to the beam shaping optical unit described above, which undertakes the spatial realignment of the laser power or the laser energy of the heating beam.

The laser light generated by the laser diodes emerges from the optical fibers bundled in the fiber bundle with a divergence angle that is less than or equal to the acceptance angle of the optical fibers. The heating beam can be collimated by an optical element, for example by a converging lens, which is disposed at a distance of its focal length from the output-side fiber ends, before the heating beam enters the beam shaping optical unit.

In a further embodiment, the processing machine includes a sensor device, e.g., a camera, for spatially resolved capture of an actual temperature distribution of the powder in the processing field. The processing field can be observed through the beam path of the heating beam or of the processing beam; however, in principle, it is also possible to position the sensor device at—virtually—any other point above or with a lateral offset to the processing field. The camera, which can be embodied as a thermal imaging camera, in particular, allows a spatially resolved measurement of the actual temperature distribution and consequently allows deviations from a target temperature distribution to be identified, the latter typically being a homogeneous target temperature distribution in the processing field.

In a further embodiment, the processing machine includes an open-loop and/or closed-loop control device for setting the power of the heating radiation source and/or the intensity distribution of the beam profile of the heating beam on the basis of a construction progress of the production of the three-dimensional component and/or on the basis of the spatially resolved captured actual temperature distribution. As described herein, the temperature distribution of the powder in the processing plane can change over time on the basis of the construction progress, i.e., on the basis of the number of layers of the three-dimensional component already generated and, additionally, on the basis of the geometry of these layers.

To take this change into account over time and to generate a homogeneous temperature distribution of the powder in the processing field, where possible at all times during the production process, the power of the heating radiation source and/or the intensity distribution of the heating beam can be controlled on the basis of the progress of construction. For control purposes, it is possible to resort to correction data that were determined either empirically or by simulations before the production process is performed. The correction data take account of the temporal development of the temperature distribution of the powder in the processing field when heating the powder from the underside and by the processing beam when melting the powder, and so the control device can set the temporal profile of the power and/or the intensity distribution of the heating beam in such a way that the temperature distribution of the powder that is as homogeneous as possible is generated in the processing plane during the entire production process. As an alternative or in addition thereto, the power of the heating radiation source and/or the intensity distribution of the heating beam can be controlled on the basis of the spatially dependent actual temperature distribution in the processing plane, as instantaneously measured with the aid of the sensor device.

In one development, the open-loop and/or closed-loop control device is embodied to adjust the actual temperature distribution in the processing field to a homogeneous (as homogeneous as possible) target temperature distribution in the processing field; i.e., the temperature distribution should be the same at each location of the processing field. Within the meaning of this application, a homogeneous temperature distribution is understood to mean a temperature distribution in which the difference between a maximum temperature and a minimum temperature is less than approximately 30 K.

In a further embodiment, the processing beam passes through the heating beam in the irradiating device, in particular in the scanner device. As described further above, the heating beam can be radiated into the process chamber together with the processing beam through a common window. To this end, it can be necessary or advantageous, if the beam path of the processing beam and the beam path of the heating beam overlap.

Independently of whether or not the beam path of the heating beam overlaps with the beam path of the processing beam, the heating beam, which is generally collimated downstream of the beam shaping optical unit, can be focused into an intermediate focus with the aid of a focusing optical element, for example, such that the heating beam emerges divergently from the irradiating device and covers the space to the processing plane with divergent propagation. A stop, e.g., a narrow stop, can be disposed in the region of the intermediate focus, the heating beam extending through the stop to protect the scanner mirror or mirrors of the scanner device from the spatial beam propagation of the heating beam. In particular, the stop can be disposed between two scanner mirrors of the scanner device, which are used to deflect the processing beam. The distance between the intermediate focus or between the focusing optical element and the processing plane is chosen in such a way that the edge of the beam profile of the heating beam approximately corresponds to the edge of the processing field. Expressed differently, the diameter of the beam profile of the heating beam in the processing plane typically substantially corresponds to the diameter of the processing field.

In another aspect, the disclosure provides methods, of the type set forth herein, for heating a powder. The methods include generating a heating beam with a first beam profile, converting the first beam profile of the heating beam into a second beam profile, e.g., a ring-shaped beam profile, and heating the powder from above by aligning the heating beam with the second beam profile on a processing field of the processing machine, on which an opening of the container is formed. In some embodiments, the methods further include heating the powder from below by heating the lowerable support to which the powder is applied.

In the case of the methods, too, there is auxiliary heating of the powder from above in those portions of the processing field where the powder cools down too much. As described herein, this can be, for example, a ring-shaped portion, in particular an annular portion, in which additional heat can be supplied to the powder with the aid of the heating beam with the ring-shaped beam profile. Dual heating of the powder from below and from above shortens the heating time for the powder.

In certain embodiments, the methods include altering a power of the heating beam and/or an intensity distribution of the beam profile of the heating beam on the basis of a construction progress of the production of the three-dimensional component and/or on the basis of a spatially resolved captured actual temperature distribution of the powder in the processing field. As described herein, the power of the heating beam or a heating radiation source for generating the heating beam and/or the intensity distribution of the beam profile of the heating beam can be set or controlled on the basis of the construction progress in such a way that an (approximately) homogeneous temperature distribution sets in in the processing field over the entire duration of the production process. As an alternative or in addition thereto, there can be adjustment to a target temperature distribution of the powder, which is as homogeneous as possible, in the processing field on the basis of the (instantaneous) spatially resolved captured target temperature distribution in the processing field.

Further advantages of the disclosure are apparent from the description and the drawing. The aforementioned features and the features mentioned further below can likewise be employed in each case by themselves or in any desired combination. The embodiments shown and described should not be understood to be an exhaustive list, but rather have an exemplary character for the purpose of illustrating the disclosure.

DETAILED DESCRIPTION

In the following description of the drawings, identical reference signs are used for the same components or for components having the same function.

Figure 1A:
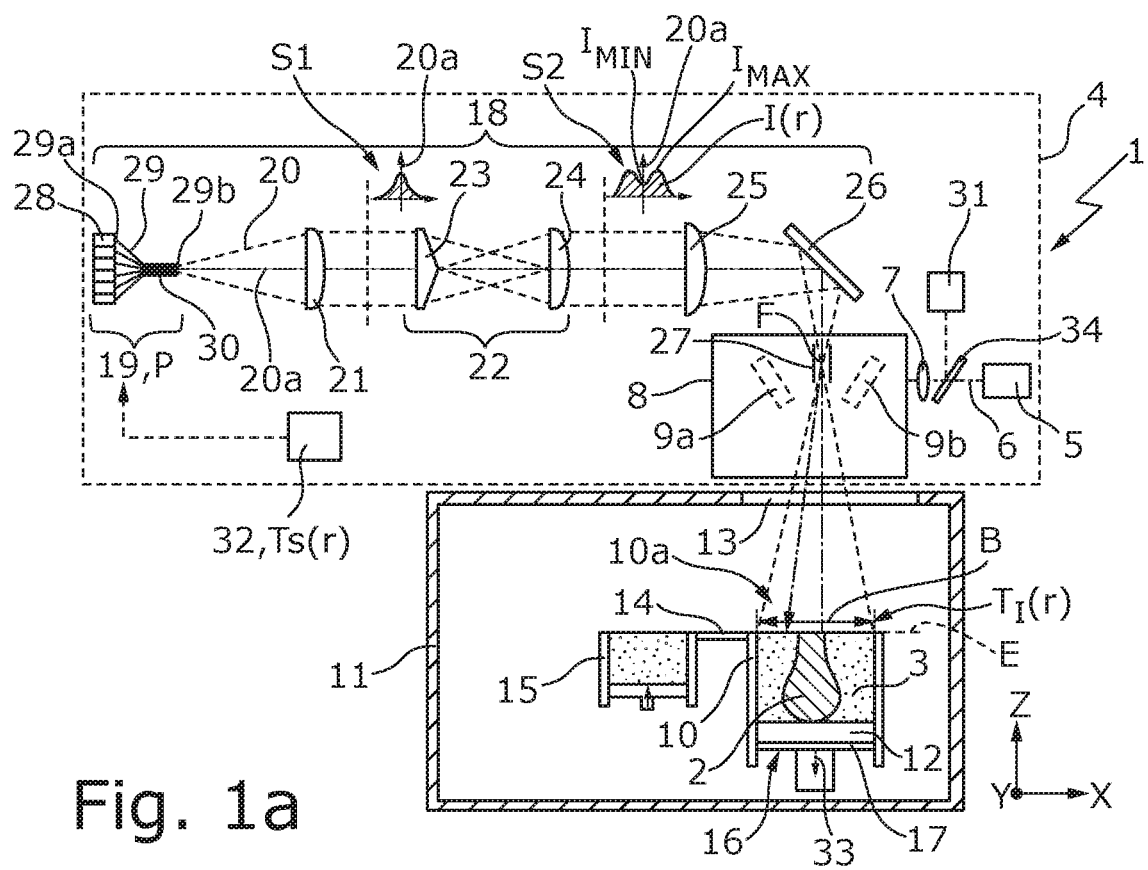
FIG. 1A is a schematic illustration that shows a processing machine for producing three-dimensional components by irradiating powder by an irradiating device, which includes a heating radiation source for generating a heating beam and a beam shaping optical unit as disclosed herein.

FIG. 1A shows an example of a structure of a processing machine 1 for producing a three-dimensional component 2 by irradiating metallic powder 3, which forms a powder bed in the example shown in FIG. 1A, in which the three-dimensional component 2 or its already completed volume region, illustrated in FIG. 1A, is embedded. The processing machine 1 includes an irradiating device 4, which includes a laser source 5 in the form of a fiber laser for generating a processing beam 6 in the form of a laser beam. In the shown example, the laser beam is a high power processing beam 6, which is used for irradiating or locally melting the powder 3.

For irradiating the powder 3, the processing beam 6 initially passes through a focusing device 7 in the form of a lens and subsequently enters a scanner device 8, which includes two scanner mirrors 9a, 9b in the form of galvanometer mirrors (shown in dashed lines). The scanner device 8 serves to position the processing beam 6 in a processing field B of the scanner device 8, the extent of which in the example shown in FIG. 1A substantially corresponds to the lateral extent of the powder bed or of the powder 3. The processing field B, which can be irradiated by means of the processing beam 6 or by means of the irradiating device 4, is restricted by the maximum deflection of the two scanner mirrors 9a, 9b.

As can likewise be identified in FIG. 1A, the powder 3 is disposed in an upwardly open container 10 (also referred to as a construction cylinder), which is situated in a process chamber 11 of the processing machine 1. The wall of the process chamber 11 has a window 13 for radiating the processing beam 6 into the process chamber 11. A support 12, which forms the base of the container 10, can be lowered and raised in the vertical direction Z of an XYZ coordinate system by virtue of a drive, not shown in any more detail, acting on the support 12. The support 12 can have an integral embodiment, as illustrated in FIG. 1A; however, depending on the type of powder 3 and the production process, it is also possible to use a multi-part support 12, which has a base (not represented pictorially), which closes off the container 10 at the bottom and which is adjoined by a piston-shaped part of the support 12. Where necessary, a building platform, on which the three-dimensional component 2 is constructed and which is not illustrated in any more detail either, can be attached to the base.

The processing field B forms a portion of a processing plane E, which is formed on the top of a worktop 14 that surrounds the container 10 on all sides. The worktop 14 is disposed in the process chamber 11 in such a way that the top of the worktop 14 lies in the processing plane E. For producing a layer of the three-dimensional component 2, the uppermost layer of the powder 3 or of the powder bed, which is disposed in the processing field B in the processing plane E, is irradiated with the aid of the processing beam 6. In the process, the powder 3 is selectively melted and solidified in the regions that correspond to the cross section of the respective layer of the three-dimensional component 2 to be produced.

Since the processing field B, in which the powder 3 is molten, remains at a constant distance from the scanner device 8 and consequently at a constant distance from the focusing lens 7 which focuses the processing beam 6 into the processing plane E during the production of the three-dimensional component 2, the support 14 is lowered by the thickness of one powder layer to enable applying a new layer of the powder 3, as indicated in FIG. 1A by an arrow 33. With the aid of a transport device, not represented pictorially, which may have a pusher, for example, additional powder 3 is taken from a storage container 15 that is likewise disposed in the process chamber 11 and transported along the top of the worktop 14 to an upper opening 10a of the container 10 to form a further powder layer there for producing the three-dimensional component 2, the further powder layer subsequently being irradiated by the processing beam 6.

For preheating or heating the powder 3, the processing machine 1 includes a further heating device 16, which heats the support 12 and warms the powder 3 from below. In the example shown in FIG. 1A, the further heating device 16 includes a plate-shaped heating element 17, the heating element being embodied as a resistance heater and being pressed into the support 12. In this case, the further heating device 16 forms an electrical resistance heater, which applies current to the heating element 17 to heat the powder 3 as homogeneously as possible from below. In place of a further heating device 16 in the form of a resistance heater, any other type of further heating device 16 that has at least one heating element in contact with the support 12 can also be used. By way of example, heating elements through which a liquid flows can also be used.

It was found that heating the powder 3 from below with the aid of the further heating device 16 as a rule does not lead to a homogeneous temperature distribution of the powder 3 in the processing field B on account of the geometry. Instead, heat losses that arise, inter alia, by convection, by heat conduction via the metallic powder 3 directly to the generally cooled wall of the container 10 and by radiation losses to all adjacent surfaces lead to an increasingly inhomogeneous heat distribution in the container 10 with increasing powder fill level (i.e., with increasing distance between the top side of the powder bed at the upper opening 10a and the support 12). If the support 12 is lowered into the typically cylindrical container 10, a temperature distribution that is similar to a Gaussian temperature distribution typically forms in the powder 3, with a maximum temperature typically being assumed on the cylinder axis of the container 10, which extends in the vertical direction. Alternatively, a temperature distribution that is similar to a conical or conical frustum-like temperature distribution may also form.

As a rule, it is advantageous for the production of the three-dimensional component 2 if the powder 3 has an (actual) temperature distribution TI(r) (r: distance from the vertically extending central axis of the container 10) that is as homogeneous as possible over the entire processing field B, which is circular in the shown example. In general, such a temperature distribution TI(r) cannot be generated with the aid of the above-described further heating device 16, which heats the powder 3 from below. For generating a temperature distribution TI(r) that is as homogeneous as possible in the processing field B, the processing machine 1, more precisely their radiating device 4, therefore includes a heating device 18 which is described in more detail below.

The heating device 18 includes a heating radiation source 19 for producing a heating beam 20, which is aligned in the processing field B for heating the powder 3 in the processing field B from above. The heating beam 20 divergently emerging from the heating radiation source 19 is initially collimated by a converging lens 21. As may likewise be identified in FIG. 1A, the heating beam 20 is generated by the heating radiation source 19 with a first beam profile S1, the intensity distribution of which, Gaussian in the shown example, is transformed in relation to a beam axis 20a of the heating beam 20 into a second, ring-shaped beam profile S2 with the aid of a beam shaping optical unit 22. In the case of the ring-shaped beam profile S2, the intensity maximum of the radial intensity distribution I(r) of the heating beam 20 is spaced apart from the beam axis 20a; i.e., unlike in the case of the first beam profile S1, the intensity maximum is not situated in the center or on the beam axis 20a of the heating beam 20.

For converting the first beam profile S1 into the second beam profile S2, the beam shaping optical unit 22 shown in FIG. 1A includes a plano-convex axicon 23, which converts the first beam profile S1 of the heating beam 20, entering the beam shaping optical unit 22 in collimated fashion, into the second, ring-shaped beam profile S2. An apex angle of the plano-convex axicon 23 is chosen in such a way that a minimum intensity ($I_{MIN}$) of the second beam profile S2 on the beam axis 20a of the heating beam 20 is no more than 60% of a maximum intensity ($I_{MAX}$) of the second beam profile S2 of the heating beam 20. The heating beam 20, propagating in divergent fashion downstream of the axicon 23, is collimated with the aid of a further converging lens 24. With the aid of a focusing lens 25, the collimated heating beam 20 is focused onto an intermediate focus F via a deflection mirror 26, a stop 27 being disposed at the focus. As may be identified from FIG. 1A, the stop 27 is disposed between the two scanner mirrors 9a, 9b of the scanner device 8.

Downstream of the intermediate focus F, the heating beam 20 propagates in divergent fashion and strikes the processing field B in the processing plane E in divergent fashion to heat the powder 3. The focusing lens 25 is disposed at such a distance in relation to the processing plane E that the (external) diameter of the heating beam 20 substantially corresponds to the diameter of the opening 10a of the container 10, and consequently to the diameter of the processing field B. The processing beam 6, which is moved over the processing field B with the aid of the scanner mirrors 9a,b, extends through the heating beam 20, or the processing beam 6 and the heating beam 20 overlap upon emergence from the scanner device 8.

By irradiating the powder 3 in the processing field B from above with the aid of the heating beam 20 with the ring-shaped beam profile S2, the powder 3 is additionally heated in a ring-shaped region around the central axis of the container 10. In this way, thermal energy is supplied to the powder 3 in the portion, typically lying at the edge of the processing field B, in which, for geometric reasons, there is increased heat dissipation when the powder 3 is heated from below, to generate an (actual) temperature distribution $T_f(r)$ in the processing field B that is as homogeneous and uniform as possible.

It was found that, in general, the temperature distribution $T_f(r)$ in the processing field B is not constant over time during the production process when heating the powder 3 in the processing field B from below with the aid of the further heating device 16, to be precise for the following reasons. First, the layers of the three-dimensional component 2 have good thermal conductivity while the powder 3 itself has comparatively poor thermal conductivity, and so the temperature distribution $T_f(r)$ during the production of the three-dimensional component 2 is altered over the course of the construction progress, i.e., with the number of layers of the three-dimensional component 2 already produced.

Second, the support 12 is lowered during the production process of the three-dimensional component 2, as a result of which the temperature distribution $T_f(r)$ in the powder bed, and hence in the processing field B, likewise varies with time. The substantially Gaussian temperature distribution $T_f(r)$, which is formed in the processing field B, because the powder 3 is heated from below with the aid of the further heating device 16, can therefore be flatter or steeper, depending on time. To obtain a substantially homogeneous temperature distribution $T_f(r)$ in the processing field B during the entire production process, the processing machine 1, the irradiating device 4 in the shown example, includes an open-loop and/or closed-loop control device 32, which is embodied to set the power P of the heating radiation source 19 or to alter the latter in such a way during the production process that a substantially homogeneous temperature distribution $T_f(r)$ is generated in the processing field B by heating the powder 3 from below with the aid of the further heating device 16 and by heating the powder 3 from above with the aid of the heating device 18 or with the aid of the heating beam 20.

In the simplest case, the open-loop and/or closed-loop control device 32 to this end sets the power P of the heating radiation source 19 during the production process on the basis of data about the temporal profile of the actual temperature distribution $T_f(t)$ in the processing field B, which was determined in a preceding production process of a three-dimensional component 2 with identical geometry (but without heating the powder 3 from above) or on account of simulations of the heat distribution in the container 10 or in the processing field B. In this case, it is possible to dispense with a closed-loop control of the power P of the heating radiation source 19.

In the example shown in FIG. 1A, the processing machine 1 includes a sensor device 31 in the form of a thermal imaging camera, which is embodied to instantaneously capture the actual temperature distribution $T_f(r)$ of the powder 3 in the processing field B. To this end, the beam path of the sensor device 31 is coupled into the beam path of the processing beam 6 by way of a partly transmissive mirror 34. When the sensor device 31 is used, the open-loop and/or closed-loop control device 32 can set the power P of the heating radiation source 19 on the basis of the actual temperature distribution $T_f(r)$ captured in spatially resolved fashion, to be precise in such a way that the ring-shaped beam profile S2 of the heating device 18 has an intensity profile I(r) that is substantially inverted to the measured actual temperature distribution $T_f(r)$ so that the actual temperature distribution $T_f(r)$ can be adjusted to a target temperature distribution Ts(r) with a temperature that is as constant as possible over the entire processing field B.

To set the power P of the heating radiation source 19, the open-loop and/or closed-loop control device 32 can set a current supplied to a plurality of laser diodes 28, which form part of the heating radiation source 19. The number of laser diodes 28 of the heating radiation source 19 is chosen in such a way that these are able to produce, overall, a maximum power P of the heating beam 20 of between approximately 100 W and approximately 3000 W. The heating radiation source 19 also includes a number of optical fibers 29 corresponding to the number of laser diodes 28. An input-side fiber end 29a of a respective optical fiber 29 is coupled to an associated laser diode 28 in order to couple the laser radiation generated by the laser diode 28 into the optical fiber 29. Output-side fiber ends 29b of the optical fibers 29 are disposed adjacent to one another in a common plane and form a fiber bundle 30 for focusing the laser radiation of the laser diodes 28 on a spot or an image point, from which the heating beam 20 emerges with a divergence angle that is smaller than the acceptance angle of the optical fibers 29. As described further above, the heating beam 20 emanating from the fiber ends 29a is collimated by the converging lens 21, which is disposed at the distance of its focal length f from the plane with the fiber ends 29b of the optical fibers 29.

Figure 1B:
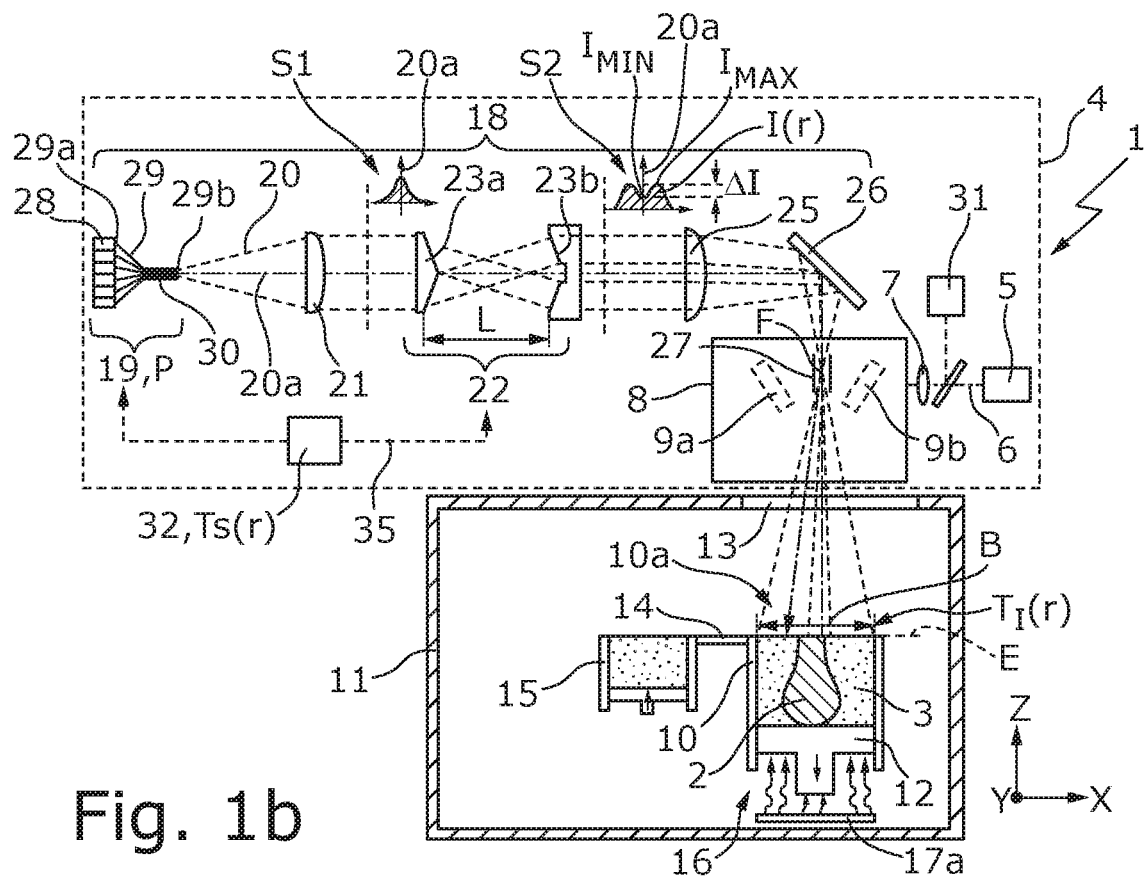
FIG. 1B is a schematic illustration that is analogous to FIG. 1A, and shows a beam shaping optical unit embodied to set or alter an intensity distribution of a beam profile of the heating beam in the radial direction with respect to the beam axis of the heating beam.

To generate an actual temperature distribution $T_f(r)$ that is as homogeneous as possible in the processing field B, it is advantageous if, in addition to the power P of the heating radiation source 19 (or possibly as an alternative thereto), the (radial) intensity distribution I(r) of the ring-shaped beam profile S2 of the heating beam 20, which is generated by the beam shaping optical unit 22, can also be altered. For this purpose, use can be made of, for example, a beam shaping optical unit 22, which is embodied as illustrated in FIG. 1B. The beam shaping optical unit 22 of FIG. 1B substantially differs from the beam shaping optical unit 22 of FIG. 1A in that two axicons 23a,b are used instead of one axicon 23. Here, the first, plano-convex axicon 23a corresponds to the axicon 23 of the beam shaping optical unit 22 of FIG. 1A; the second, plano-concave axicon 23b replaces the collimation lens 24 of the beam shaping optical unit 22 of FIG. 1A.

The second axicon 23b has the same apex angle as the first axicon 23a, and so the heating beam 20 collimated upstream of the first axicon 23a likewise propagates in collimated fashion downstream of the second axicon 23b. The distance L between the first axicon 23a and the second axicon 23b along the beam axis 20a of the heating beam 20 can be altered or set with the aid of at least one displacement device, which is not represented pictorially. In this way, it is possible, for example, to set an intensity difference ΔI between a minimum intensity $I_{MIN}$ on the beam axis 20a of the second beam profile 20 and a maximum intensity $I_{MAX}$ in a typically ring-shaped beam profile region of the second beam profile S2, which is spaced apart from the beam axis 20a. As an alternative or in addition thereto, altering the distance L between the two axicons 23a, 23b can also set the distance between the beam axis 20a of the heating beam 20 and the ring-shaped beam profile region, where the second beam profile S2 has its maximum intensity $I_{MAX}$.

As indicated by an arrow 35 in FIG. 1B, the open-loop and/or closed-loop control device 32 can act on the beam shaping optical unit 22 for open-loop or closed-loop control of the actual temperature distribution $T_f(r)$ in the processing field B to a target temperature distribution Ts(r) that is as homogeneous as possible, to suitably alter the distance L between the two axicons 23a, 23b and hence suitably alter the intensity distribution I(r) of the ring-shaped beam profile S2.

As can likewise be identified in FIG. 1B, the further heating device 16 for heating the powder 3 from below includes an infrared radiation source 17a, for example, in the form of a quartz emitter, to heat the support 12 as homogeneously as possible on its underside. It is understood that the further heating device 16 for heating the powder 3 from below can also include different types of heating elements, which possibly generate a temperature distribution $T_f(r)$ in the processing field B that is non-Gaussian. In this case, too, a ring-shaped beam profile S2 with a suitable, not necessarily rotationally symmetric intensity distribution I(r) can be generated with the aid of the heating device 18 or with the aid of the beam shaping optical unit 22 in order to additionally heat the powder 3 in targeted fashion at the points where the powder 3 is not heated sufficiently during heating from below or where the powder cools down too much.

OTHER EMBODIMENTS

It is to be understood that while the disclosure has been described in conjunction with the detailed description thereof, the foregoing description is intended to illustrate and not limit the scope of the disclosure, which is defined by the scope of the appended claims. Other aspects, advantages, and modifications are within the scope of the following claims.

What is claimed is:

1. A processing machine for producing three-dimensional components layer by layer by irradiating a powder by a processing beam, comprising:
    a container with an opening and a moveable support for the powder;
    an irradiating device comprising a processing beam scanner for aligning the processing beam on a processing field at the opening of the container for producing the three-dimensional component layer by layer by irradiating and melting the powder,
    wherein the irradiating device further comprises a heater comprising:
        a heating radiation source for generating a heating beam for heating the powder from above by aligning the heating beam on the processing field, wherein the heating radiation source is arranged and controlled to align a beam axis of the heating beam in stationary fashion on a point of the processing field irrespective of a position of the processing beam in the processing field; and a beam shaping optical unit configured to convert a first beam profile of the heating beam into a second beam profile of the heating beam, wherein the beam shaping optical unit comprises at least one axicon for generating the second beam profile, wherein the second beam profile comprises a ring-shaped beam profile, and wherein a diameter of the ring-shaped beam profile of the heating beam in the processing plane substantially corresponds to a diameter of the processing field.

2. The processing machine of claim 1, wherein the processing beam comprises a laser beam.

3. The processing machine of claim 1, further comprising a further heater for heating the powder from below by heating the moveable support.

4. The processing machine of claim 3, wherein the further heater comprises an infrared radiation source or a heating element embedded in the moveable support, or both, for heating the moveable support.

5. The processing machine of claim 1, wherein the beam shaping optical unit is configured to set an intensity distribution of the second beam profile of the heating beam.

6. The processing machine of claim 5, wherein the beam shaping optical unit is configured to set an intensity difference between a minimum intensity and a maximum intensity of the second beam profile of the heating beam.

7. The processing machine of claim 1, wherein the beam shaping optical unit is configured to generate a second beam profile of the heating beam, in which a minimum intensity of the heating beam along a beam axis of the heating beam is at least 60% of a maximum intensity of the heating beam.

8. The processing machine of claim 5, wherein the beam shaping optical unit comprises a second axicon, and the spacing of the two axicons is adjustable for altering the intensity distribution of the second beam profile of the heating beam.

9. The processing machine of claim 1, wherein the heating radiation source is configured to generate the heating beam with an adjustable power.

10. The processing machine of claim 1, wherein the heating radiation source comprises a plurality of laser diodes for generating the heating beam.

11. The processing machine of claim 10, wherein the heating radiation source comprises a plurality of optical fibers, wherein a respective input-side fiber end of an optical fiber is coupled to a respective laser diode and wherein output-side fiber ends of the optical fibers form a fiber bundle for emergence of the heating beam.

12. The processing machine of claim 1, further comprising a sensor for spatially resolved capture of a temperature distribution of the powder in the processing field.

13. The processing machine of claim 12, wherein the sensor comprises a camera.

14. The processing machine of claim 1, wherein the processing beam passes through the heating beam.

15. A method for heating a powder, which is applied on a moveable support of a container in a processing machine for producing three-dimensional components layer by layer, the method comprising:

generating a heating beam with a first beam profile;

converting the first beam profile of the heating beam into a second beam profile, wherein the second beam profile comprises a ring-shaped beam profile, and wherein a diameter of the ring-shaped beam profile of the heating beam substantially corresponds to a diameter of a processing field; and heating the powder from above by aligning the heating beam with the second beam profile on a point of a processing field of the processing machine irrespective of a position of a processing beam in the processing field, on which an opening of the container is formed.

16. The method of claim 15, further comprising heating the powder from below by heating the moveable support to which the powder is applied.

17. The method of claim 15, further comprising altering a power of the heating beam, or an intensity distribution of the second beam profile of the heating beam, or altering both, on the basis of a construction progress of the production of the three-dimensional component or on the basis of a spatially resolved captured temperature distribution of the powder in the processing field, or on the basis of both the construction progress and the spatially resolved captured temperature distribution.

* * * * *